(12) United States Patent
Mentovich et al.

(10) Patent No.: US 11,184,085 B1
(45) Date of Patent: Nov. 23, 2021

(54) ELECTRO-OPTICAL INTERCONNECT ASSEMBLY WITH INTEGRAL TAMPERING PROTECTION

(71) Applicant: MELLANOX TECHNOLOGIES, LTD., Yokneam (IL)

(72) Inventors: Elad Mentovich, Tel Aviv (IL); Liron Mula, Ramat Gan (IL); Yuval Itkin, Zoran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/010,857

(22) Filed: Sep. 3, 2020

(51) Int. Cl.
| | | |
|---|---|---|
| *G02F 1/00* | (2006.01) |
| *G02F 2/00* | (2006.01) |
| *H04B 10/00* | (2013.01) |
| *H04J 14/00* | (2006.01) |
| *H04B 10/03* | (2013.01) |
| *H04B 10/25* | (2013.01) |
| *H04B 10/27* | (2013.01) |
| *H04B 10/50* | (2013.01) |
| *G02B 6/42* | (2006.01) |
| *H04B 10/40* | (2013.01) |
| *H04L 9/32* | (2006.01) |
| *H04L 9/08* | (2006.01) |
| *H04L 9/06* | (2006.01) |
| *H04B 10/66* | (2013.01) |

(52) U.S. Cl.
CPC .......... *H04B 10/03* (2013.01); *G02B 6/4246* (2013.01); *H04B 10/25* (2013.01); *H04B 10/27* (2013.01); *H04B 10/40* (2013.01); *H04B 10/50* (2013.01); *H04B 10/66* (2013.01); *H04L 9/0662* (2013.01); *H04L 9/0838* (2013.01); *H04L 9/3271* (2013.01)

(58) Field of Classification Search
CPC ....... H04L 9/3271; H04B 10/40; H04B 10/50; H04B 10/03; G02B 6/4246
See application file for complete search history.

(56) References Cited

U.S. PATENT DOCUMENTS

| | | | |
|---|---|---|---|
| 8,577,042 B2 | 11/2013 | Worthy | |
| 2005/0113068 A1* | 5/2005 | Hoffmann | H04L 9/3263 455/411 |
| 2006/0117181 A1* | 6/2006 | Brickell | H04L 9/3271 713/176 |

(Continued)

FOREIGN PATENT DOCUMENTS

EP          0586192 A1    3/1994

*Primary Examiner* — David C Payne
*Assistant Examiner* — Pranesh K Barua
(74) *Attorney, Agent, or Firm* — Kligler & Associates Patent Attorneys Ltd

(57) ABSTRACT

An electro-optical (EO) interconnect assembly includes an optical fiber, and first and second EO transceivers. The first and second EO transceivers, which are coupled to respective ends of the optical fiber, are configured to (i) connect to respective first and second network devices, (ii) exchange electrical signals with the first and second network devices, (iii) convert between the electrical signals and optical signals, and exchange the optical signals with one another over the optical fiber, and (iv) conduct with one another, over the optical fiber, a secure challenge-response transaction, and to initiate a responsive action upon failure of the challenge-response transaction.

21 Claims, 2 Drawing Sheets

(56) References Cited

U.S. PATENT DOCUMENTS

| | | | |
|---|---|---|---|
| 2009/0016735 A1* | 1/2009 | Schmitz | G01V 8/12 398/140 |
| 2009/0240945 A1* | 9/2009 | Aronson | H04L 63/08 713/176 |
| 2009/0304384 A1* | 12/2009 | Li | H04J 14/0267 398/58 |
| 2011/0029773 A1* | 2/2011 | Effenberger | H04L 9/3271 713/168 |
| 2011/0033049 A1* | 2/2011 | Aronson | H04L 9/3271 380/256 |
| 2012/0151210 A1* | 6/2012 | Perez | H04L 63/107 713/168 |
| 2016/0277123 A1* | 9/2016 | Fink | H04B 10/25752 |
| 2017/0366254 A1* | 12/2017 | Gao | H04B 10/03 |
| 2018/0123268 A1* | 5/2018 | Leigh | H01R 12/7005 |
| 2018/0249232 A1* | 8/2018 | Putnins | H04Q 11/0067 |
| 2020/0293696 A1* | 9/2020 | Motwani | H04L 9/0656 |

\* cited by examiner

ELECTRO-OPTICAL INTERCONNECT ASSEMBLY WITH INTEGRAL TAMPERING PROTECTION

FIELD OF THE INVENTION

The present invention relates generally to communication networks employing electrical and optical EO interconnects, and particularly to EO interconnect security.

BACKGROUND OF THE INVENTION

Techniques to secure optical data links from being physically tempered have been previously discussed in the patent literature. For example, Japanese Patent Application Publication JP21387893 describes securing an electronic identification system by providing means for generating a security signal and means for detecting any lack of integrity of the security signal, so as to generate a tamper warning signal. A disclosed system is composed of a first unit (control processor), a second unit (slave processor) and an optical fiber communication a link for connecting both units. The units provide each a display to identify a vehicle, each display comprising an obstacle indicator. The units further have a means for generating the security signal periodically. When the optical fiber communication link between the units is damaged or either one of both units is removed, an influence is given to the security signal, and the tamper warning signal is generated and indicated on the obstacle indicator.

As another example, U.S. Pat. No. 8,577,042 describes a system for location-based security, privacy, access control and monitoring, the system including a transmit unit to transmit a signal including a data key, and a receiving unit to receive the signal. The receiving unit is configured to determine an encryption key based at least in part on the data key and to decrypt encrypted data using the encryption key.

SUMMARY OF THE INVENTION

An embodiment of the present invention that is described hereinafter provides an electro-optical (EO) interconnect assembly including an optical fiber, and first and second EO transceivers. The first and second EO transceivers, which are coupled to respective ends of the optical fiber, are configured to (i) connect to respective first and second network devices, (ii) exchange electrical signals with the first and second network devices, (iii) convert between the electrical signals and optical signals, and exchange the optical signals with one another over the optical fiber, and (iv) conduct with one another, over the optical fiber, a secure challenge-response transaction, and to initiate a responsive action upon failure of the challenge-response transaction.

In some embodiments, the first and second EO transceivers include respective Pseudo-Random Binary Sequence (PRBS) encoders and respective PRBS decoders, which are configured to encode and decode a challenge and a response of the challenge-response transaction, so as to transmit the challenge and the response over the optical fiber as PRBSs.

In some embodiments, the PRBS encoders and the PRBS decoders include Linear Feedback Shift Registers (LFSRs).

In some embodiments, the first and second EO transceivers comprise respective encoders and respective decoders, which are configured to encode and decode a challenge and a response of the challenge-response transaction using Walsh functions, so as to transmit the challenge and the response over the optical fiber as a Walsh code.

In some embodiments, the first and second EO transceivers comprise respective encoders and respective decoders, which are configured to encode and decode a challenge and a response of the challenge-response transaction using Barker sequences, so as to transmit the challenge and the response over the optical fiber as a Barker code.

In some embodiments, the first and second EO transceivers comprise respective encoders and respective decoders, which are configured to encode and decode a challenge and a response of the challenge-response transaction using Kasami sequences, so as to transmit the challenge and the response over the optical fiber as a Kasami sequence.

In some embodiments, the first and second EO transceivers comprise respective encoders and respective decoders, which are configured to encode and decode a challenge and a response of the challenge-response transaction using Gold sequences, so as to transmit the challenge and the response over the optical fiber as a Gold sequence.

In an embodiment, the first and second EO transceivers are configured to encrypt and decrypt the challenge-response transaction using a cryptographic key installed therein.

In another embodiment, the responsive action includes deactivation of data transmission between the first and second EO transceivers.

In some embodiments, at least one of the first and second EO transceivers includes a panel-pluggable EO transceiver. In other embodiments, at least one of the first and second EO transceivers includes a mid-board EO transceiver.

There is additionally provided, in accordance with another embodiment of the present invention, an electro-optical (EO) interconnect securing method, the method includes using an EO interconnect assembly that comprises first and second EO transceivers coupled to respective ends of an optical fiber, connecting to respective first and second network devices, exchanging electrical signals with the first and second network devices, converting between the electrical signals and optical signals, and exchanging the optical signals over the optical fiber. A secure challenge-response transaction is conducted between the first and the second EO transceivers, over the optical fiber, and a responsive action is initiated upon failure of the challenge-response transaction.

There is further provided, in accordance with an embodiment of the present invention, an electro-optical (EO) transceiver for coupling an optical fiber to an electronic network device. The EO transceiver includes an EO transmitter, an EO receiver and processing circuitry. The EO transmitter is configured to convert electrical signals from the electronic network device into optical signals for transmission on the optical fiber. The EO receiver is configured to convert optical signals from the optical fiber into electrical signals for transmission to the electronic network device. The processing circuitry is configured to conduct a secure challenge-response transaction over the optical fiber with a peer EO transceiver, and to initiate a responsive action upon failure of the challenge-response transaction.

The present invention will be more fully understood from the following detailed description of the embodiments thereof, taken together with the drawings in which:

DETAILED DESCRIPTION OF EMBODIMENTS

Overview

Figure 1:
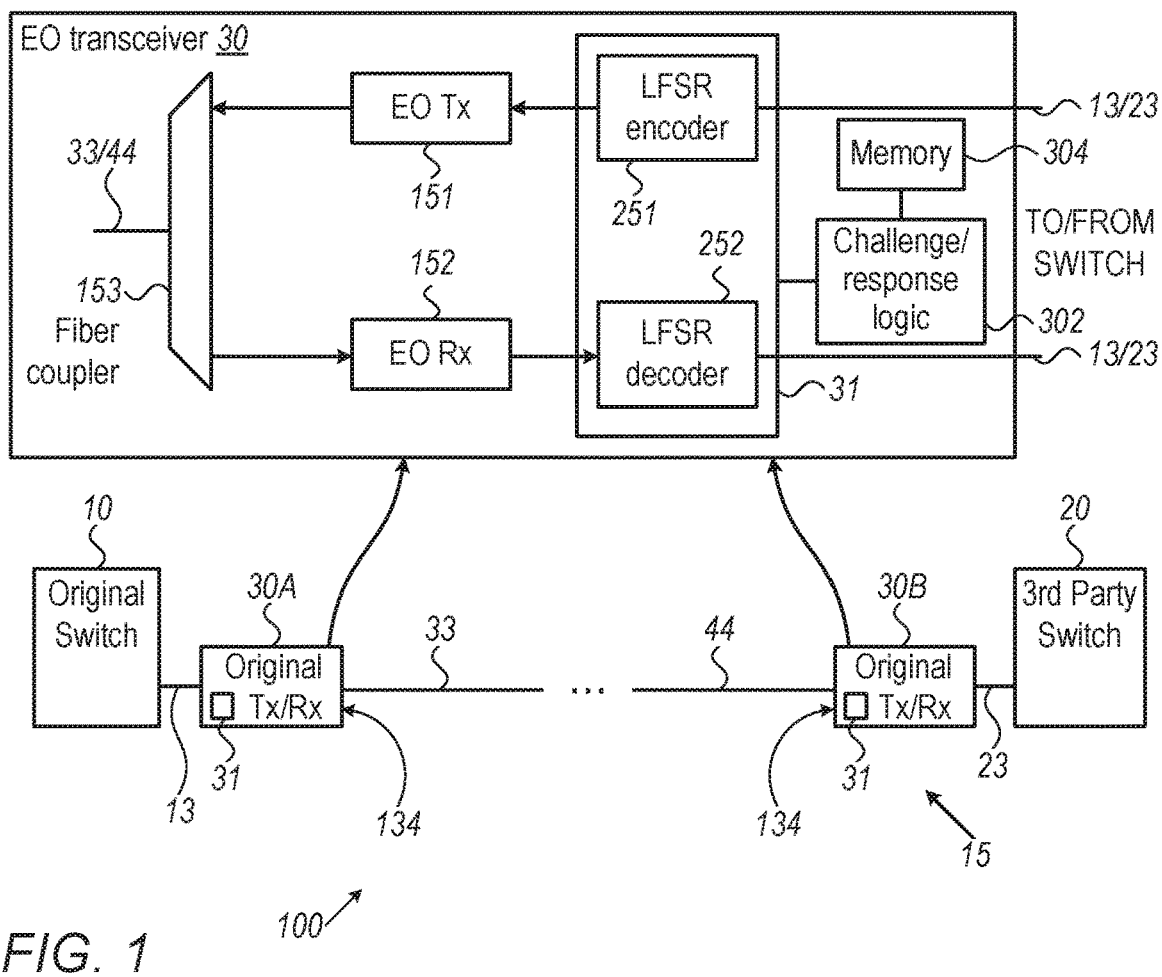
FIG. 1 is a schematic block diagram of an optical network comprising original and third-party switches and an electro-optical (EO) interconnect between them, in accordance with an embodiment of the present invention.

Optical data center networks (ODCN) and optical networks in general comprise multiple network devices, such as optical switches, that are connected to one another by Electro-Optical (EO) interconnects, typically comprising optical fibers and transceivers. For example, a given EO interconnect that connects a pair of switches typically comprises, or is coupled on both ends to, EO transceivers that are configured to (a) convert electrical signals received from a network device (e.g., a switch) into optical signals and transmit the optical signals over the EO interconnect, and (b) convert optical signals received over the EO interconnect into electrical signals and transmit the electrical signals to another network device (e.g., a switch).

A major risk in an ODCN is unauthorized access to data transmitted over an EO interconnect. One method of performing such an unauthorized access is to replace a genuine (e.g., original) EO interconnect with a malicious one. A possible way to tamper with the EO interconnect itself is by replacing one of its transceivers with a malicious one, which has extra connectivity, through which the malicious transceiver leaks the stolen data.

In such a case, applying a challenge-response authentication protocol between the network devices, in which one network device (e.g., switch) presents a question ("challenge") and another network device must provide a valid response to be authenticated will not detect the tampering.

Embodiments of the present invention that are described hereinafter provide methods and devices for securing an EO interconnect by a transceiver-to-transceiver authentication technique. In some embodiments, the disclosed technique provides an EO interconnect assembly comprising a pair of pluggable EO transceivers connected at respective ends of an optical fiber. The EO transceivers are typically used to connect network-connected devices (e.g., remote client switches, network adapters such as Network Interface Cards (NICs) and Host Channel Adapters (HCAs), Smart-NICs (NICs having embedded CPUs), network-enabled Graphics Processing Units (GPUs), and the like). The terms "network-connected device" and "network device" are used interchangeably herein. The description that follows refers mainly to switches, by way of example.

Each of the pluggable EO transceivers may be of a type that plugs into a socket on a panel of the switch, or a transceiver that plugs into a socket on a board inside the switch (i.e., a mid-board transceiver, or a Mid Board Optical Engine (MBOM)).

To this end, and with either type of pluggable EO transceiver (e.g., panel or mid-board), the disclosed technique performs a challenge-response transaction between the EO transceivers themselves, rather than between the network devices. This technique is able to detect, among various types of security attacks, an attempt to replace an EO transceiver with a rogue transceiver.

One challenge associated with the disclosed technique is that the communication channel between the EO transceivers is noisy and characterized by a high Bit Error Rate (BER), e.g., on the order of between $10^{-3}$ and $10^{-4}$. (In a typical system, forward error correction (FEC) is applied to the data only at a later stage, by the network devices.) Therefore, in some embodiments the EO transceivers encode the challenge and response information with Pseudo-Random Bit Sequences (PRBSs), e.g., using suitable Linear Feedback Shift Registers (LFSRs). In other embodiment, the EO transceivers encode the challenge and response information with one of Walsh functions, Gold sequence, Barker sequence, and Kasami sequence which have also known to generates respective codes that are immune to random noise (e.g., codes having a sufficient SNR).

In an embodiment, each such EO transceiver comprises a memory and processing circuitry. The memory holds a security key. The processing circuitry is configured to generate a random challenges (e.g., random numbers), to generate responses to received random challenges, and to verify the correctness of received responses. The processing circuitry is further configured to encode and decode the random challenges and responses using PRBSs.

In some embodiments, a first EO transceiver generates a random challenge and encodes the challenge into a PRBS. The first EO transceiver transmits the encoded challenge over the optical fiber to a second EO transceiver. The second EO transceiver receives the encoded random challenge, decodes the challenge and verifies it using a preinstalled security key, and generates an encrypted response to the random challenge. Only a transceiver installed with a correct security key can generate a correct encrypted response. The second EO transceiver transmits the encrypted response over the optical fiber to the first EO transceiver, which, using the same preinstalled security key, authenticates the response and verifies that the EO interconnect has not been tampered with. If the encrypted response is deemed by the first EO transceiver to be incorrect, the first EO transceiver initiates a suitable responsive action, e.g., outputs a corresponding indication.

For example, in case the first EO transceiver determines that the response received from the second EQ transceiver is not authentic, the first EO transceiver outputs an indication that is used by a network device of the OCDN to shut-down (e.g., cease data transmission over) the possibly tampered channel, and to issue an alert of the possible tampering attempt.

In some embodiments, the first EO transceiver generates a random challenge, encrypts it, and then encodes it by generating a series of (one or more) PRBSs. Each PRBS in the series encodes one or more bits of the challenge. The second EO transceiver receives the PRBSs, decodes and decrypts the challenge, and generates an encrypted response that it then transmits using a similar mechanism. The first EO transceiver can verify the response by using the same encryption key, also installed in the first EO transceiver.

In one embodiment, the challenge and/or response is encoded by selecting the PRBSs from among a predefined set of PRBSs known to both transceivers. For example, if the set consists of four PRBSs, then every PRBS in the series encodes two bits. In another embodiment, only a single PRBS is used. In this embodiment, one or more bits are encoded by transmitting the PRBS with a respective (typically cyclic) offset relative to a known reference position. For example, when using four possible offsets, two bits can be encoded in each PRBS being transmitted.

The embodiments described above serve only as examples, since numerous other embodiments for generating a random challenge and subsequently using the disclosed LFSR encoding/decoding capabilities of the transceivers are possible, and hence all such are considered within the scope of the present disclosure.

The disclosed technique, which utilizes existing EO transceivers (e.g., already installed in the field) that have the above capabilities (e.g., to hold a security protocol and a key, and to encode and decode information with PRBS), enables a user to secure existing EO interconnects without resorting to dedicated hardware or software to enable the security protocols. The disclosed transceiver-to-transceiver authentication technique may therefore enable cost-effective EO interconnect security over optical networks.

System Description

FIG. 1 is a schematic block diagram of an optical network 100 comprising original and third-party switches 10 and 20, and an electro-optical (EO) interconnect 15 between them, in accordance with an embodiment of the present invention. In the shown embodiment, the EO interconnect is made of several optical interconnects, one of which is an optical interconnect 33 that is coupled to a first original EO transceiver 30A on one end of the EO interconnect, and the other an optical interconnect 44 that is coupled to a second original EO transceiver 30B, on the other end of EO interconnect 15. Transceiver 30A is assumed to be receiving over an electrical line 13 electrical signals outputted by switch 10 and converting these electrical signals into optical signals transmitted by the transceiver via interconnect 33. Transceiver 30B is assumed to be receiving these optical signals and converting them into electrical signals that the transceiver outputs to switch 20 over an electrical line 23 between the two.

In the shown embodiment, EO transceivers 30A and 30B are identical. As the inset shows in a highly simplified and schematic block diagram, such transceivers comprise an electrical layer comprising a PRBS encoder (in the present example an LFSR encoder 251) and a PRBS decoder (in the present example an LFSR decoder 252), which are controlled by the aforementioned processing circuitries 302 (also referred to as "challenge-response logic") that to this end comprise dedicated algorithms and use a memory 304. The transceivers further comprise an optical layer comprising optical transmit (151) and optical receive (152) devices, and a fiber coupler 153 to transmit or receive light from fibers 33/44, respectively.

For simplicity and clarity of presentation, additional elements of the transceiver are not shown, which include, data serialization, mux/demux, and signal amplification and filtration, to name several.

In FIG. 1, both transceivers 30A and 30B are genuine (e.g., original) devices, comprising genuine processing circuitries 31, that are both uploaded with a same, genuine, encryption key 134. Therefore, using an authentication protocol such as described in FIG. 3, network 100 will be proved to be free of the physical tampering attempts described above.

The network configuration shown in FIG. 1 is chosen purely for the sake of conceptual clarity. Any other configuration can be used in alternative embodiments. For example, a multi EO interconnect network, with each EO interconnect being secured of tampering by the disclosed technique. Elements that are not mandatory for understanding the disclosed techniques, such as electronic devices, are omitted from the figure for simplicity of presentation. FIG. 1 illustrate a given use-case from the plurality of possible use cases.

A Tampered System Description

Figure 2:
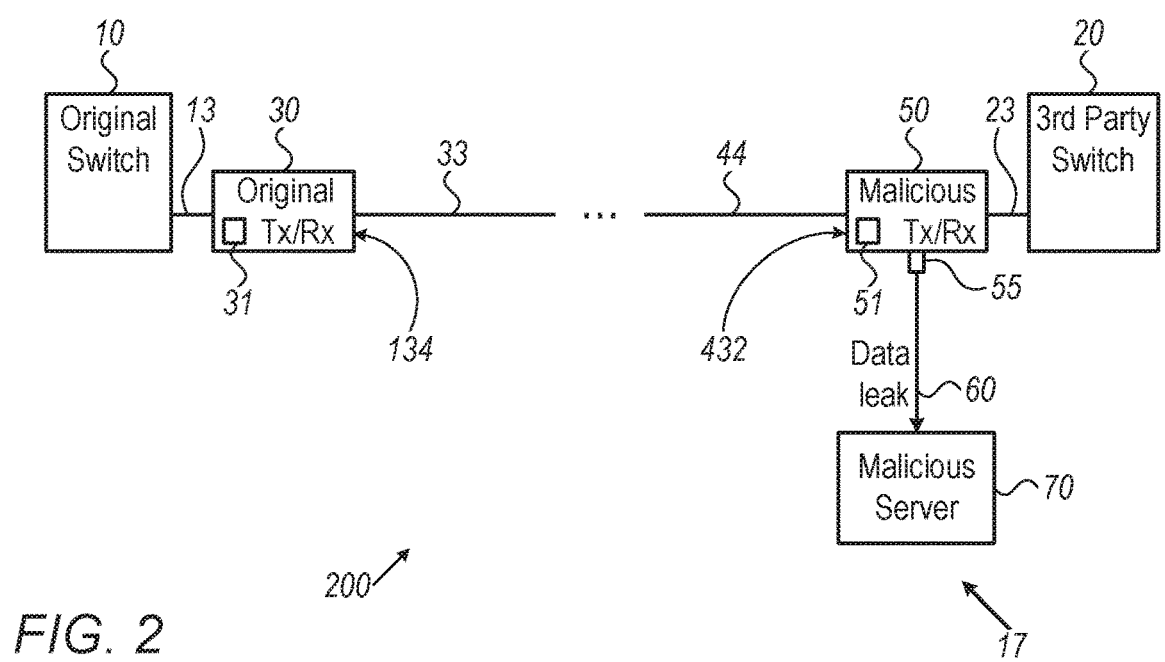
FIG. 2 is a schematic block diagram of an optical network comprising original and third-party switches and a physically tampered electro-optical (EO) interconnect between them, in accordance with an embodiment of the present invention.

FIG. 2 is a schematic block diagram of an optical network 200 comprising original and third-party switches 10 and 20, and a physically tampered electro-optical (EO) interconnect 17 between them, in accordance with an embodiment of the present invention. In the shown embodiment, a malicious transceiver 50 is incorporated into the network, with transceiver 50 being fully functional but which includes malicious functionality.

In some embodiments, a malicious action includes replacing transceiver 30B with a transceiver 50, while in other embodiments (not shown), optical interconnect 44 is replaced as well. As seen, the malicious functionality is expressed by malicious transceiver 50 having an additional port 55 to connect (60) a malicious server 70 to copy data, and possibly to perform other hacking activities. However, transceiver 50 comprises a non-genuine processing circuitry 51 that is uploaded with a non-genuine encryption key 432. Therefore, using an authentication protocol such as described in FIG. 3, network 200 will be assumed to be exposed to physical tampering as described above, and, correspondingly, transceiver 30A of network 200 will issue an alert and will deactivate (e.g., cease data transmission over) EO interconnect 17.

In various embodiments, the different elements of the networks shown in FIGS. 1 and 2 may be implemented using suitable hardware, such as using one or more discrete components, one or more Application-Specific Integrated Circuits (ASICs) and/or one or more Field-Programmable Gate Arrays (FPGAs). Some of the functions of the disclosed networks, e.g., some or all functions of the EO transceivers, may be implemented in one or more general-purpose processors, which are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory.

FIG. 2 is brought by way of example, and the technique shown in FIG. 2 is applicable to other network connected devices that use EO interconnects to connect to another network device, such as the aforementioned HCAs and Smart-NIC.

Figure 3:
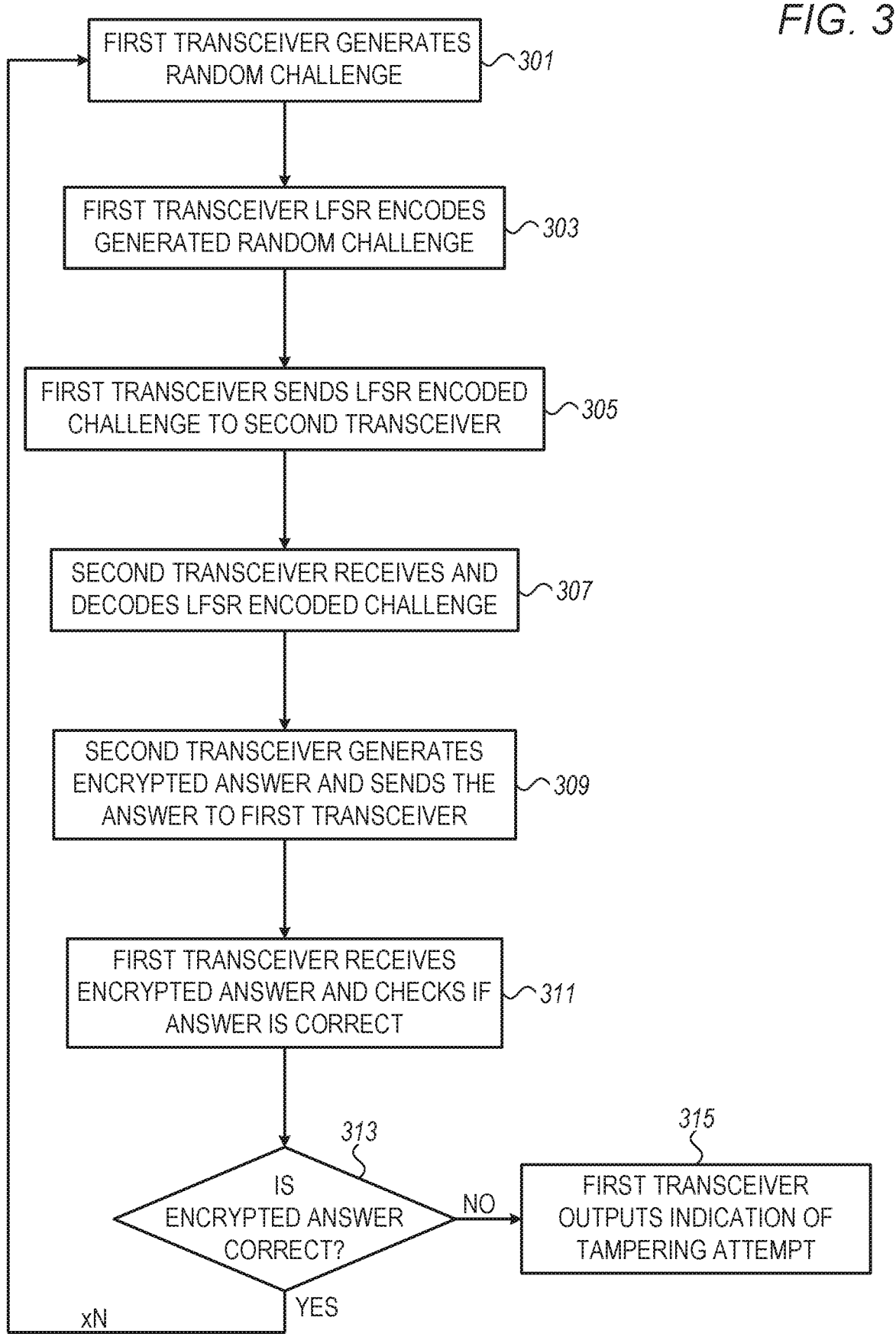
FIG. 3 is a flow chart that schematically illustrates a method for securing the EO interconnect of FIG. 1 against physical tampering, in accordance with some embodiments of the present invention.

Transceiver Tampering Protection Using an Authentication Protocol Over Noisy Channel FIG. 3 is a flow chart that schematically illustrates a method for securing the electro-optical (EO) interconnect of FIG. 1 against physical tampering, in accordance with some embodiments of the present invention. The process begins at a random challenge generation step 301, during which processing circuitry 31 comprised in transceiver 30A generates an encrypted random challenge.

Next, at an LFSR encoding step 303, the random challenge is encoded by LFSR elements of processing circuitry 31 to produce a series of (one or more) PRBSs. As explained above, in one embodiment, the challenge is encoded by selecting the PRBSs from among a predefined set of PRBSs known to both EO transceivers. In another embodiment, only a single PRBS is used. In this embodiment, one or more bits are encoded by transmitting the PRBS with a respective (typically cyclic) offset relative to a known reference position.

Next, at a transmission step 305, transceiver 30 sends the LFSR-encoded challenge to a receiving transceiver (i.e., the second transceiver), which may be a genuine transceiver, such as transceiver 30B, or be a malicious transceiver, such as transceiver 50.

The second transceiver receives and decodes the LFSR-encoded challenge, at a decoding step 307. Any malicious transceiver is assumed to have the capability to accurately perform step 307 for any of random LFSR-encoded challenge. And hence, by itself, successfully performing step 307 cannot be used for security proofing.

However, in a next encrypting step 309, the second transceiver must encrypt and send a response within a given, limited time after the challenge is sent. In some embodiments, generating an encrypted response in step 309 comprises the processing circuitry of the second transceiver applying a hash function to the decoded challenge. The second transceiver typically encodes the response using a similar PRBS mechanism as used for encoding the challenge.

If no response is received in transceiver 30A, then processing circuitry 31 of transceiver 30A assumes that the EO interconnect was compromised (e.g., tampered) and issues an alert and deactivates transmission over this EO interconnect.

In general, the protocol assumes that an encrypted response is received by transceiver 30A at a receiving step 311. Subsequently, using key 134, processing circuitry 31 of transceiver 30A checks (313) if the response is correct (i.e., that encryption in the second transceiver is genuine).

If the received response is correct, the process returns to step 301, for example, after some time interval, to recheck authenticity of the second transceiver. The process may repeat N times over a given time duration (e.g., for each calendric date).

If, on the other hand, the received response is deemed by circuitry 31 as incorrect, then processing circuitry 31 of transceiver 30A assumes that the EO interconnect is tampered and issues an alert, and, optionally, deactivates transmission, at a response to possible tampering step 315. Although the embodiments described herein mainly address control of transmission of high data rates in communication systems employing EO interconnects, the methods and systems described herein can also be used in other applications, such as in graphics processing unit (GPU), GPU-to-GPU links, and in EO optical engine for the aforementioned Mid Board Optical Engine (MBOM) and as active part of transceiver.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electro-optical (EO) interconnect assembly for connecting between first and second network devices, the EO interconnect assembly comprising:
    an optical fiber; and
    first and second EO transceivers, which are coupled to respective ends of the optical fiber and are configured to:
        plug into respective sockets in the respective first and second network devices, exchange electrical signals with the first and second network devices, convert between the electrical signals and optical signals, and exchange the optical signals with one another over the optical fiber; and
        conduct with one another, between the first and second EO transceivers over the optical fiber, a secure challenge-response transaction, and initiate a responsive action upon failure of the challenge-response transaction,
    wherein the first and second EO transceivers are configured to conduct the secure challenge-response transaction entirely within the EO interconnect assembly, independently of the first and second network devices.

2. The EO interconnect assembly according to claim 1, wherein the first and second EO transceivers comprise respective Pseudo-Random Binary Sequence (PRBS) encoders and respective PRBS decoders, which are configured to encode and decode a challenge and a response of the challenge-response transaction, so as to transmit the challenge and the response over the optical fiber as PRBSs.

3. The EO interconnect assembly according to claim 2, wherein the PRBS encoders and the PRBS decoders comprise Linear Feedback Shift Registers (LFSRs).

4. The EO interconnect assembly according to claim 1, wherein the first and second EO transceivers comprise respective encoders and respective decoders, which are configured to encode and decode a challenge and a response of the challenge-response transaction using Walsh functions, so as to transmit the challenge and the response over the optical fiber as a Walsh code.

5. The EO interconnect assembly according to claim 1, wherein the first and second EO transceivers comprise respective encoders and respective decoders, which are configured to encode and decode a challenge and a response of the challenge-response transaction using Barker sequences, so as to transmit the challenge and the response over the optical fiber as a Barker code.

6. The EO interconnect assembly according to claim 1, wherein the first and second EO transceivers comprise respective encoders and respective decoders, which are configured to encode and decode a challenge and a response of the challenge-response transaction using Kasami sequences, so as to transmit the challenge and the response over the optical fiber as a Kasami sequence.

7. The EO interconnect assembly according to claim 1, wherein the first and second EO transceivers comprise respective encoders and respective decoders, which are configured to encode and decode a challenge and a response of the challenge-response transaction using Gold sequences, so as to transmit the challenge and the response over the optical fiber as a Gold sequence.

8. The EO interconnect assembly according to claim 1, wherein the first and second EO transceivers are configured to encrypt and decrypt the challenge-response transaction using a cryptographic key installed therein.

9. The EO interconnect assembly according to claim 1, wherein the responsive action comprises deactivation of data transmission between the first and second EO transceivers.

10. The EO interconnect assembly according to claim 1, wherein at least one of the first and second EO transceivers comprises a panel-pluggable EO transceiver.

11. The EO interconnect assembly according to claim 1, wherein at least one of the first and second EO transceivers comprises a mid-board EO transceiver.

12. The EO interconnect assembly according to claim 1, wherein the failure of the challenge-response transaction is indicative of replacement of one of the first and second EO transceivers with a rogue EO transceiver.

13. An electro-optical (EO) interconnect securing method, the method comprising:
   using an EO interconnect assembly that connects between first and second network devices, the EO interconnect assembly comprising first and second EO transceivers coupled to respective ends of an optical fiber and pluggable into respective sockets in the respective first and second network devices, exchanging electrical signals with the first and second network devices, converting between the electrical signals and optical signals, and exchanging the optical signals over the optical fiber; and
   conducting between the first and the second EO transceivers, over the optical fiber, a secure challenge-response transaction, and initiating a responsive action upon failure of the challenge-response transaction,
   wherein the first and second EO transceivers are configured to conduct the secure challenge-response transaction entirely within the EO interconnect assembly, independently of the first and second network devices.

14. The method according to claim 13, wherein conducting the secure challenge-response transaction comprises encoding and decoding a challenge and a response of the challenge-response transaction in the EO transceivers so as to produce Pseudo-Random Binary Sequences (PRBSs), and transmitting the PRBSs over the optical fiber.

15. The method according to claim 14, wherein encoding the challenge and the response is performed using Linear Feedback Shift Registers (LFSRs).

16. The method according to claim 13, wherein conducting the secure challenge-response transaction comprises encoding and decoding a challenge and a response of the challenge-response transaction in the EO transceivers so as to produce Walsh sequences, and transmitting the Walsh sequences over the optical fiber.

17. The method according to claim 13, wherein conducting the secure challenge-response transaction comprises encoding and decoding a challenge and a response of the challenge-response transaction in the EO transceivers so as to produce Barker sequences, and transmitting the Barker sequences over the optical fiber.

18. The method according to claim 13, wherein conducting the secure challenge-response transaction comprises encoding and decoding a challenge and a response of the challenge-response transaction in the EO transceivers so as to produce Kasami sequences, and transmitting the Kasami sequences over the optical fiber.

19. The method according to claim 13, wherein conducting the secure challenge-response transaction comprises encoding and decoding a challenge and a response of the challenge-response transaction in the EO transceivers so as to produce Gold sequences, and transmitting the Gold sequences over the optical fiber.

20. The method according to claim 13, wherein conducting the secure challenge-response transaction comprises encrypting and decrypting the challenge-response transaction using a cryptographic key.

21. The method according to claim 13, wherein initiating the responsive action comprises deactivating data transmission between the first and second EO transceivers.

* * * * *